United States Patent
Chang et al.

(10) Patent No.: US 9,976,879 B2
(45) Date of Patent: May 22, 2018

(54) COLOR WHEEL ROTATION SPEED DETECTING MODULE

(71) Applicant: DELTA ELECTRONICS, INC., Taoyuan (TW)

(72) Inventors: Meng-Sheng Chang, Taoyuan (TW); Keh-Su Chang, Taoyuan (TW); Hui-Hsiung Wang, Taoyuan (TW); Ching-Chao Chen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 43 days.

(21) Appl. No.: 15/014,193

(22) Filed: Feb. 3, 2016

(65) Prior Publication Data
US 2017/0045382 A1  Feb. 16, 2017

(30) Foreign Application Priority Data
Aug. 14, 2015 (TW) .............................. 104126494 A

(51) Int. Cl.
  *G01D 5/34* (2006.01)
  *G01D 5/347* (2006.01)
  *G01P 3/36* (2006.01)

(52) U.S. Cl.
  CPC .............. *G01D 5/3473* (2013.01); *G01P 3/36* (2013.01)

(58) Field of Classification Search
  CPC ..................................................... G03B 21/14
  See application file for complete search history.

(56) References Cited

U.S. PATENT DOCUMENTS 5,848,849 A * 12/1998 Kishi .................. B41J 3/39
                                                                 347/109
2008/0174744 A1* 7/2008 Myoung ................ G03B 33/08
                                                                 353/84

FOREIGN PATENT DOCUMENTS

| CN | 203311071 | | 11/2013 | |
|---|---|---|---|---|
| JP | 2006106240 A | * | 4/2006 | |
| TW | 515208 | | 12/2002 | |
| TW | 200828257 | | 7/2008 | |
| TW | 201224630 | | 6/2012 | |
| TW | 201520672 | | 6/2015 | |
| WO | WO 2014194863 A1 | * | 12/2014 | ............. G03B 33/08 |

* cited by examiner

*Primary Examiner* — Casey Bryant
(74) *Attorney, Agent, or Firm* — Kirton McConkie; Evan R. Witt

(57) ABSTRACT

A color wheel rotation speed detecting module is disclosed and includes a color wheel, a motor, a rotation speed detector and a processor. The color wheel includes a first segment and at least one second segment. The motor drives the color wheel to rotate. The rotation speed detector includes an emitter and a receiver. The emitter outputs a light signal to the first segment or the second segment of the color wheel when the color wheel is rotated. When the receiver receives the light signal reflected from the second segment, the receiver outputs a detecting signal correspondingly. When the light signal passes through the first segment and the receiver fails to receive the light signal, the receiver interrupts the output of the detecting signal. The processor receives the detecting signal from the receiver, and obtains the rotating speed of the color wheel according to the detecting signal varied with time.

13 Claims, 7 Drawing Sheets

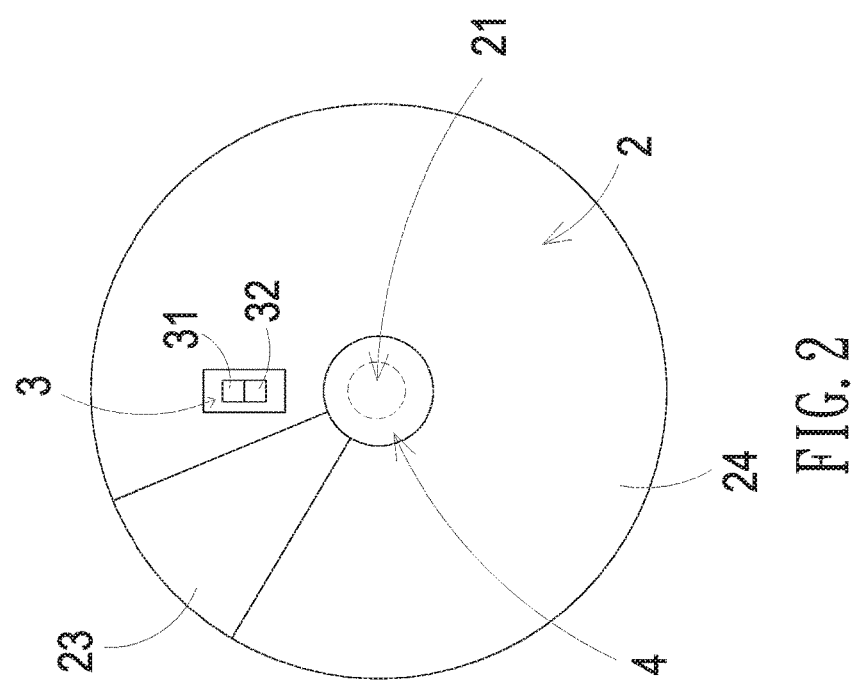

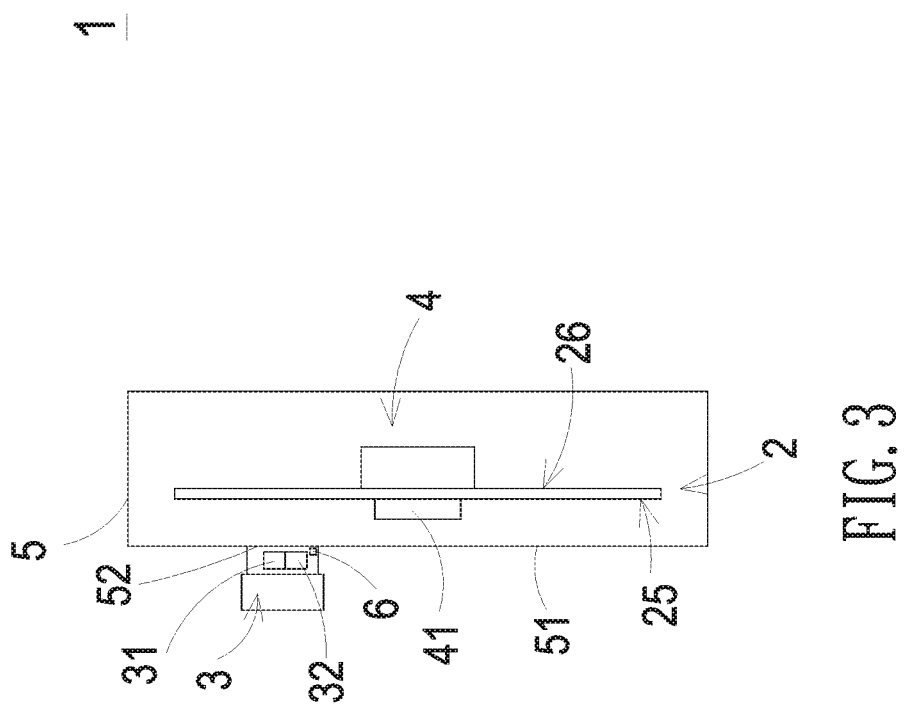

COLOR WHEEL ROTATION SPEED DETECTING MODULE

CROSS-REFERENCE TO RELATED APPLICATION

This application claims priority from Taiwan Patent Application No. 104126494, filed on Aug. 14, 2015, the entire contents of which are incorporated herein by reference for all purposes.

FIELD OF THE INVENTION

The present invention relates to a rotation speed detecting module, and more particularly to a color wheel rotation speed detecting module for detecting a rotating speed of the color wheel.

BACKGROUND OF THE INVENTION

Conventionally, a light system of a projection apparatus is usually provided with a color wheel. When a beam in a specific wavelength is emitted by a light source and projects to the color wheel, the beam in the specific wavelength is converted into a beam in the required wavelength via a wavelength conversion material coated on a single segment or plural segments of the color wheel. Consequently, the converted beam is outputted. Through the combinations of the outputted beams and the colors, a multicolor image can be projected and displayed.

Generally, the color wheel includes single segment or plural segments, and a motor drives the color wheel to rotate. Consequently, the beam in the specific wavelength is converted into one or more single color beam (i.e. in specific wavelength) or multicolor beam (i.e. in specific wavelength region) via the color wheel, and the converted beam is outputted. In order to obtain the relationship between the colors and timing of the outputted beam after the input beam is converted through the color wheel, a mark is usually disposed on the color wheel, and a rotation speed detector is disposed adjacent to the mark correspondingly. When the color wheel is rotated, the rotating speed of the color wheel can be obtained according to the signal variations relative to the mark and the rotation speed detector.

However, the conventional detecting method for detecting the rotating speed of the color wheel by adding the mark to the color wheel is complicated. When the mark is dropped or shifted from the color wheel, the rotation speed detector fails to detect the rotating speed of the color wheel. Besides, when the motor is operated and the wavelength conversion operation is performed by the color wheel, the motor and the color wheel are suffered from high temperature. Consequently, the rotation speed detector disposed adjacent to the motor and the color wheel is burned easily due to the high temperature.

Therefore, there is a need of providing a color wheel rotation speed detecting module in order to overcome the above drawbacks encountered by the prior arts.

SUMMARY OF THE INVENTION

An object of the present invention provides a color wheel rotation speed detecting module. The color wheel rotation speed detecting module directly uses the structure of the color wheel as an assistance in detecting the rotating speed of the color wheel by a light signal thereof. Under this circumstance, the mark can be omitted, and the issue of failing to detect the rotating speed of the color wheel due to the mark dropping or shifting can be prevented. Consequently, the color wheel rotation speed detecting module can be simplified in structure, and the issue of burning the rotation speed detector due to the high temperature can be prevented.

In accordance with an aspect of the present invention, a color wheel rotation speed detecting module is provided. The color wheel rotation speed detecting module comprises a color wheel, a motor, a rotation speed detector, and a processor. The color wheel comprises a first segment, at least one second segment, and a first surface. The motor is connected with the color wheel for driving the color wheel to rotate. The rotation speed detector is located beside the color wheel for detecting a rotating speed of the color wheel, wherein the rotation speed detector comprises an emitter and a receiver. The emitter is corresponding to the first surface, and outputs a light signal to the first segment or the at least one second segment of the color wheel when the color wheel is rotated. The receiver is corresponding to the first surface, and outputs a detecting signal according to whether the receiver receives the light signal. When the receiver receives the light signal reflected from the at least one second segment, the receiver outputs a detecting signal correspondingly, and when the light signal passes through the first segment and the receiver fails to receive the light signal, the receiver interrupts the output of the detecting signal. The processor receives the detecting signal from the receiver, and obtains the rotating speed of the color wheel according to the detecting signal varied with time.

In accordance with another aspect of the present invention, a color wheel rotation speed detecting module is provided. The color wheel rotation speed detecting module comprises a color wheel, a motor, a rotation speed detector, and a processor. The color wheel comprises a first segment, at least one second segment, a first surface, and a second surface, wherein the first surface is opposite to the second surface. The motor is connected with the color wheel for driving the color wheel to rotate. The rotation speed detector is located beside the color wheel for detecting a rotating speed of the color wheel, wherein the rotation speed detector comprises an emitter and a receiver. The emitter is corresponding to the first surface, and outputs a light signal to the first segment or the at least one second segment of the color wheel when the color wheel is rotated. The receiver is corresponding to the second surface, and outputs a detecting signal according to whether the receiver receives the light signal. When the receiver receives the light signal passing through the first segment, the receiver outputs a detecting signal correspondingly, and when the light signal is reflected from the at least one second segment and the receiver fails to receive the light signal, the receiver interrupts the output of the detecting signal. The processor receives the detecting signal from the receiver, and obtains the rotating speed of the color wheel according to the detecting signal varied with time.

The above contents of the present invention will become more readily apparent to those ordinarily skilled in the art after reviewing the following detailed description and accompanying drawings, in which:

BRIEF DESCRIPTION OF THE DRAWINGS

FIG. 2 schematically illustrates the front view of the color wheel rotation speed detecting module of FIG. 1, wherein a casing of the color wheel rotation speed detecting module is removed;

FIG. 3 schematically illustrates a variant example of the color wheel rotation speed detecting module of FIG. 1;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
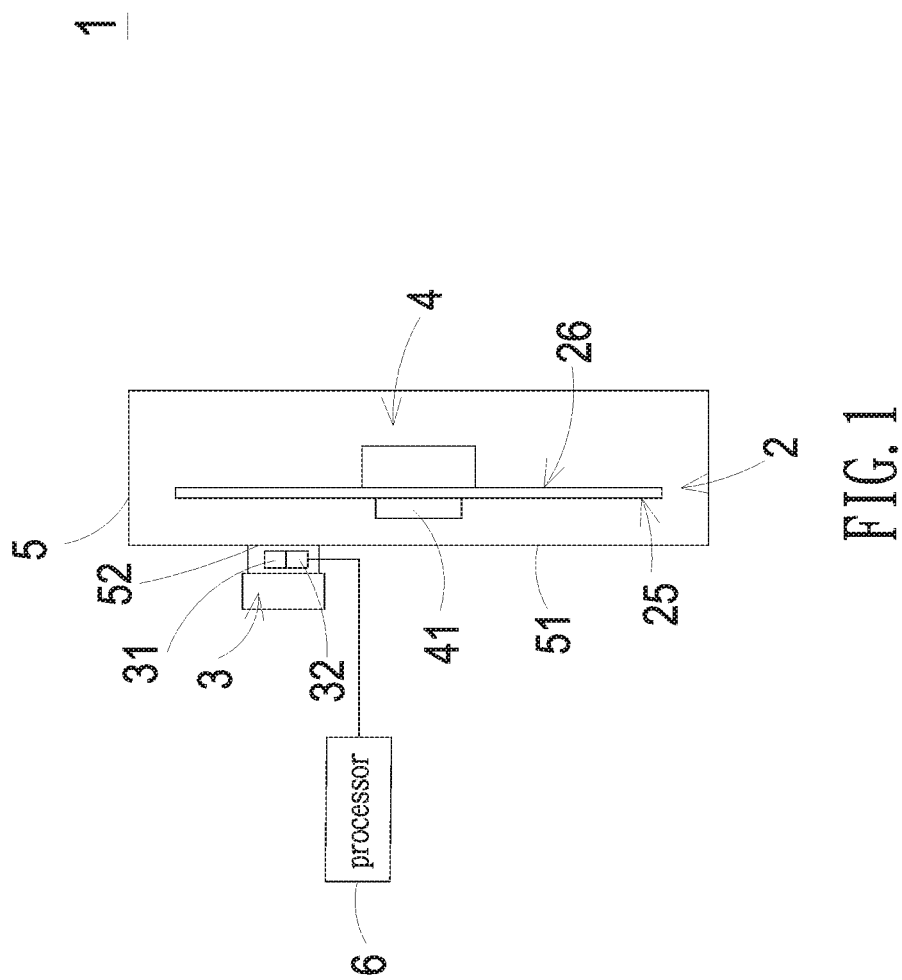
FIG. 1 schematically illustrates the side view of a color wheel rotation speed detecting module according to an embodiment of the present invention.

FIG. 1 schematically illustrates the side view of a color wheel rotation speed detecting module according to an embodiment of the present invention. FIG. 2 schematically illustrates the front view of the color wheel rotation speed detecting module of FIG. 1, wherein a casing of the color wheel rotation speed detecting module is removed. As shown in FIGS. 1 and 2, the color wheel rotation speed detecting module 1 of the present invention comprises a color wheel 2, a rotation speed detector 3, a motor 4, a casing 5, and a processor 6. The color wheel 2 comprises a first segment 23, at least one second segment 24, a first surface 25 and a second surface 26. A first side of the first segment 23 and a first side of the second segment 24 form the first surface 25, and a second side of the first segment 23 and a second side of the second segment 24 form the second surface 26. The motor 4 is disposed on a center portion 21 of the color wheel 2. The motor 4 comprises a shaft 41, and the shaft 41 is securely connected with the center portion 21 of the color wheel 2. When the motor 4 is enabled, the shaft 41 is rotated for driving the color wheel 2 to rotate simultaneously. The rotation speed detector 3 is located beside the color wheel 2 and disposed corresponding to the first surface 25 of the color wheel 2. The rotation speed detector 3 comprises an emitter 31 and a receiver 32. The emitter 31 outputs a light signal to the first segment 23 or the at least one second segment 24 of the color wheel 2 when the color wheel 2 is rotated. The receiver 32 outputs a detecting signal according to whether the receiver 32 receives the light signal. When the receiver 32 receives the light signal reflected from the at least one second segment 24, the receiver 32 outputs a detecting signal correspondingly, and when the light signal passes through the first segment 23 and the receiver 32 fails to receive the light signal, the receiver 32 interrupts the output of the detecting signal correspondingly. The processor 6 is electrically connected with the receiver 32 for receiving the detecting signal from the receiver 32, and obtains the rotating speed of the color wheel 2 according to the detecting signal varied with time. In this embodiment, the processor 6 is separated from the rotation speed detector 3. Alternatively, as shown in FIG. 3, the processor 6 can be integrated and disposed in the rotation speed detector 3.

In this embodiment, the first segment 23 of the color wheel 2 is a transparent segment or a hollow segment. The color wheel 2 comprises one or plural second segment 24. The second segment 24 comprises a wavelength conversion material, such as phosphor powder. In some embodiments, plural second segments 24 comprise wavelength conversion materials of different colors. The emitter 31 and the receiver 32 of the rotation speed detector 3 are disposed on the same side of the color wheel 2, and both of the emitter 31 and the receiver 32 face to the first surface 25. The concepts of the present invention are described as below. The first segment 23 of the color wheel 2 allows the light signal emitted from the emitter 31 to pass through, so that receiver 32 fails to receive the light signal. In addition, at least portion of the light signal is reflected by the wavelength conversion material coated on the second segment 24 of the color wheel 2, so that the receiver 32 can receive the light signal. Preferably but not exclusively, the light signal is an infrared light or an ultraviolet light. In an embodiment, the emitter 31 and the receiver 32 includes but not limited to an infrared light emitter and an infrared light receiver, respectively.

Please refer to FIGS. 1 and 2. In this embodiment, the first segment 23 of the color wheel 2 allows the light signal emitted from the emitter 31 to pass through. Consequently, the receiver 32 fails to receive the light signal via the first segment 23, and then the receiver 32 fails to produce and output the detecting signal. The second segment 24 of the color wheel 2 can reflect the light signal emitted from the emitter 31. Consequently, the receiver 32 produces and outputs the detecting signal when the light signal reflected from the second segment 24 is received.

Figure 4B:
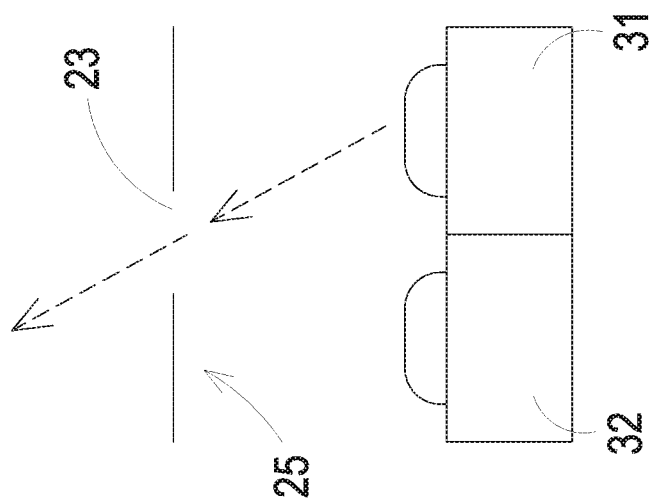
FIG. 4A and FIG. 4B are schematical views illustrating a light signal emitted from the rotation speed detector and projected to different segments of the color wheel, respectively.
Figure 4A:
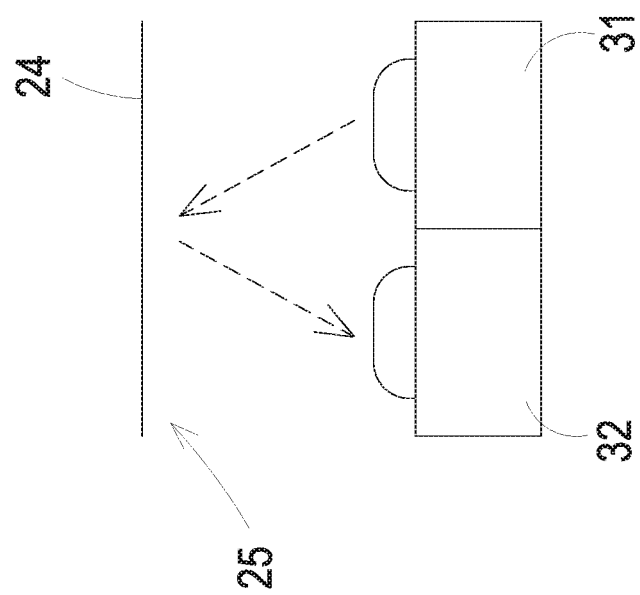

FIG. 4A and FIG. 4B are schematical views illustrating a light signal emitted from the rotation speed detector and projected to different segments of the color wheel, respectively. As shown in FIGS. 1, 2 and 4A, when the motor 4 drives the color wheel 2 to rotate and the emitter 31 of the rotation speed detector 3 emits the light signal to the first surface 25 of the color wheel 2 and further emits to the second segment 24, the light signal is reflected by the second segment 24. Under this circumstance, the receiver 32 produces and outputs the detecting signal when the receiver 32 receives the light signal reflected by the second segment 24. Besides, as shown in FIGS. 1, 2 and 4B, when the color wheel 2 is rotated continuously and the emitter 31 of the rotation speed detector 3 emits the light signal to the first surface 25 of the color wheel 2 and further passes through the first segment 23, the light signal passes through the color wheel 2 and fails to be reflected. Under this circumstance, the receiver 32 fails to produce and output the detecting signal when the receiver 32 fails to receive the light signal. Consequently, when the color wheel 2 is rotated at constant speed continuously, the receiver 32 can detect whether the light signal reflected from the second segment 24 of the color wheel 2 is received by the receiver 32 or not periodically, or the receiver 32 produces and outputs the detecting signal periodically and alternately. Therefore, the processor 6 obtains the rotating speed of the color wheel 2 according to the detecting signal varied with time.

Figure 5:
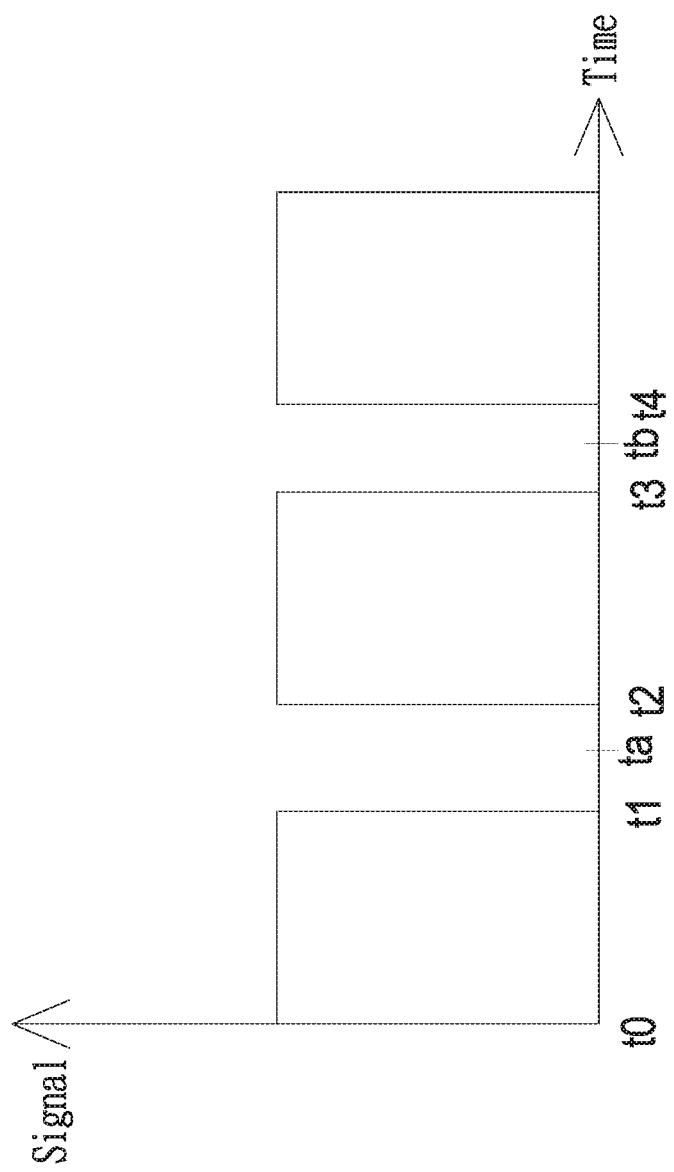
FIG. 5 is an exemplary timing diagram showing the detecting signal according to the operations between the color wheel and the receiver of the rotation speed detector.

FIG. 5 is an exemplary timing diagram showing the detecting signal according to the operations between the color wheel and the receiver of the rotation speed detector.

As shown in FIGS. 1, 2, 4A, 4B and 5, when the color wheel rotation speed detecting module 1 is enabled, the motor 4 drives the color wheel 2 to rotate, and the emitter 31 of the rotation speed detector 3 emits the light signal to the first surface 25 of the color wheel 2 for scanning across the first segment 23 and second segment 24 at different time. First, during a time period from an initial time point (t0) to a first time point (t1), the motor 4 is enabled for driving the color wheel 2 to rotate at the constant speed, and the emitter 31 of the rotation speed detector 3 emits the light signal to the first surface 25 and further emits to the second segment 24. At this time period, the receiver 32 receives the light signal reflected by the second segment 24 of the color wheel 2, and the receiver 32 produces and outputs the detecting signal correspondingly. During a time period from the first time point (t1) to a second time point (t2), the motor 4 drives the color wheel 2 to rotate at constant speed continuously, and the emitter 31 of the rotation speed detector 3 emits the light signal to the first segment 23 of the color wheel 2. At this time period, the light signal emitted from the emitter 31 of the rotation speed detector 3 passes through the first segment 23 of the color wheel 2. Consequently, the receiver 32 fails to receive the light signal reflected by the second segment 24 and fails to produce and output the detecting signal correspondingly. During a time period from the second time point (t2) to a third time point (t3), the motor 4 drives the color wheel 2 to rotated at constant speed, and the emitter 31 emits the light signal to the second segment 24 of the color wheel 2 again. At this time period, the receiver 32 receives the light signal reflected by the second segment 24 of the color wheel 2 again, and the receiver 32 produces and outputs the detecting signal correspondingly. Similarly, during a time period from the third time point (t3) to a fourth time point (t4), the motor 4 drives the color wheel 2 to rotate at constant speed, and the emitter 31 emits the light signal to the first segment 23 of the color wheel 2 again. At this time period, the light signal emitted from the emitter 31 passes through the first segment 23 again. Consequently, the receiver 32 fails to receive the light signal and the receiver 32 fails to produce and output the detecting signal correspondingly. Thus, the receiver 32 of the rotation speed detector 3 produces and outputs the detecting signal periodically and alternately, and the processor 6 obtains the rotating speed of the color wheel 2 according to the detecting signal varied with time.

For example, as shown in FIG. 5, at the first time point (t1) and the third time point (t3), the receiver 32 of the rotation speed detector 3 is switched from a status of receiving the light signal to other status of failing to receive the light signal, respectively. The rotation period of the color wheel 2 is equal to the time difference from the first time point (t1) to the third time point (t3). Therefore, the processor 6 determines the rotation period of the color wheel 2 according to the time difference from the first time point (t1) to the third time point (t3), and further calculates the rotating speed of the color wheel 2. In other words, the processor 6 obtains the rotating speed of the color wheel 2 according to two end time points of the two adjacent detecting signals.

Alternatively, at the second time point (t2) and the fourth time point (t4), the receiver 32 of the rotation speed detector 3 is switched from a status of failing to receive the light signal to other status of receiving the light signal. The rotation period of the color wheel 2 is equal to the time difference from the second time point (t2) to the fourth time point (t4). Therefore, the processor 6 determines the rotation period of the color wheel 2 according to the time difference from the second time point (t2) to the fourth time point (t4), and further calculates the rotating speed of the color wheel 2. In other words, the processor 6 obtains the rotating speed of the color wheel 2 according to two start time points of the two adjacent detecting signals.

Certainly, the method for calculating the rotating speed of the color wheel 2 is not limited to the method described above. In some embodiments, as shown in FIG. 5, a middle time point between the first time point (t1) and the second time point (t2) is obtained (i.e. an A time point (ta)), and a middle time point between the third time point (t3) and the fourth time point (t4) is obtained (i.e. a B time point (tb)). The rotation period of the color wheel 2 is equal to the time difference from the A time point (ta) to the B time point (tb), so that the processor 6 determines the rotation period of the color wheel 2 according to the time difference from the A time point (ta) to the B time point (tb), and further calculates the rotating speed of the color wheel 2.

Please refer to FIGS. 1 and 2. In this embodiment, the casing 5 comprises a wall 51, and the wall 51 has a transparent layer 52 corresponding to the color wheel 2. The rotation speed detector 3 and the color wheel 2 are disposed at two opposite sides of the wall 51, and the rotation speed detector 3 is disposed at outside of the wall 51 and corresponding to the transparent layer 52. Consequently, the light signal emitted from the emitter 31 of the rotation speed detector 3 passes through the transparent layer 52 and projects to the first segment 23 and the second segment 24 of the color wheel 2. In this embodiment, the transparent layer 52 is a heat insulation transparent layer. The rotation speed detector 3 is thermally insulated with the color wheel 2 and the motor 4 through the transparent layer 52. Consequently, the heat conduction from the color wheel 2 and the motor 4 to the rotation speed detector 3 is resisted, and the burnout of the rotation speed detector 3 due to the high temperature can be prevented.

Figure 6:
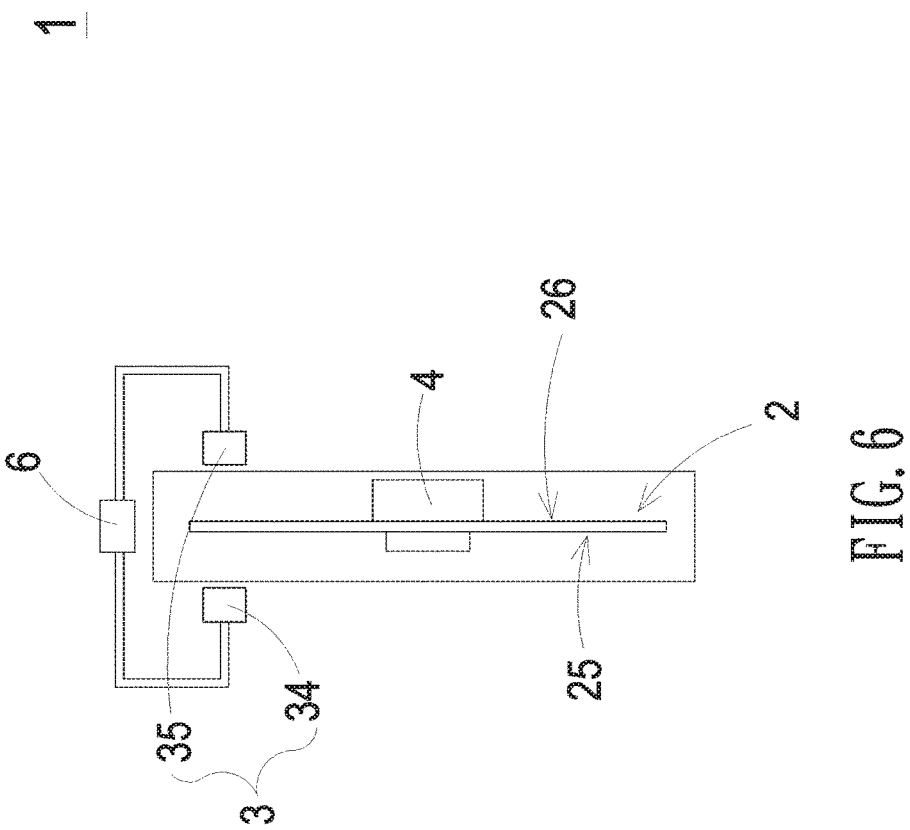
FIG. 6 schematically illustrates the side view of a color wheel rotation speed detecting module according to another embodiment of the present invention.

FIG. 6 schematically illustrates the side view of a color wheel rotation speed detecting module according to another embodiment of the present invention. As shown in FIG. 6, the structures, functions and operating principles of the color wheel rotation speed detecting module 1 are similar to those of the color wheel rotation speed detecting module as shown in FIGS. 1 and 2, and are not redundantly described herein. Component parts and elements corresponding to those of the FIGS. 1 and 2 are designated by identical numeral references, and detailed descriptions thereof are omitted. In comparison the color wheel rotation speed detecting module 1 of FIGS. 1 and 2 with that of this embodiment, the positions of the emitter 34 and the receiver 35 relative to the color wheel 2 are different. In this embodiment, the emitter 34 and the receiver 35 of the rotation speed detector 3 are disposed at two opposite sides of the color wheel 2. Namely, the color wheel 2 is located between the emitter 34 and the receiver 35. The emitter 34 faces the first surface 25 of the color wheel 2, and the receiver 35 faces the second surface 26 of the color wheel 2. In this embodiment, when the emitter 34 emits the light signal to the first segment 23 of the color wheel 2, the light signal passes through the first segment 23 of the color wheel 2 from the first surface 25 to the second surface 26. Consequently, the receiver 35 receives the light signal via the first segment 23 and produces and outputs the detecting signal correspondingly. When the emitter 34 emits the light signal to the second segment 24 of the color wheel 2, the light signal is reflected by the second segment 24. Consequently, the receiver 35 fails to receive the light signal and fails to produce and output the detecting signal correspondingly. As a result, when the color wheel 2 is rotated at the constant speed continuously and periodically, the receiver 35 of the rotation speed detector 3 can produce and output the detecting signal periodically and alternately. Thus, the processor 6 obtains the rotating speed of the color wheel 2 according to the detecting signal varied with time.

Figure 7:
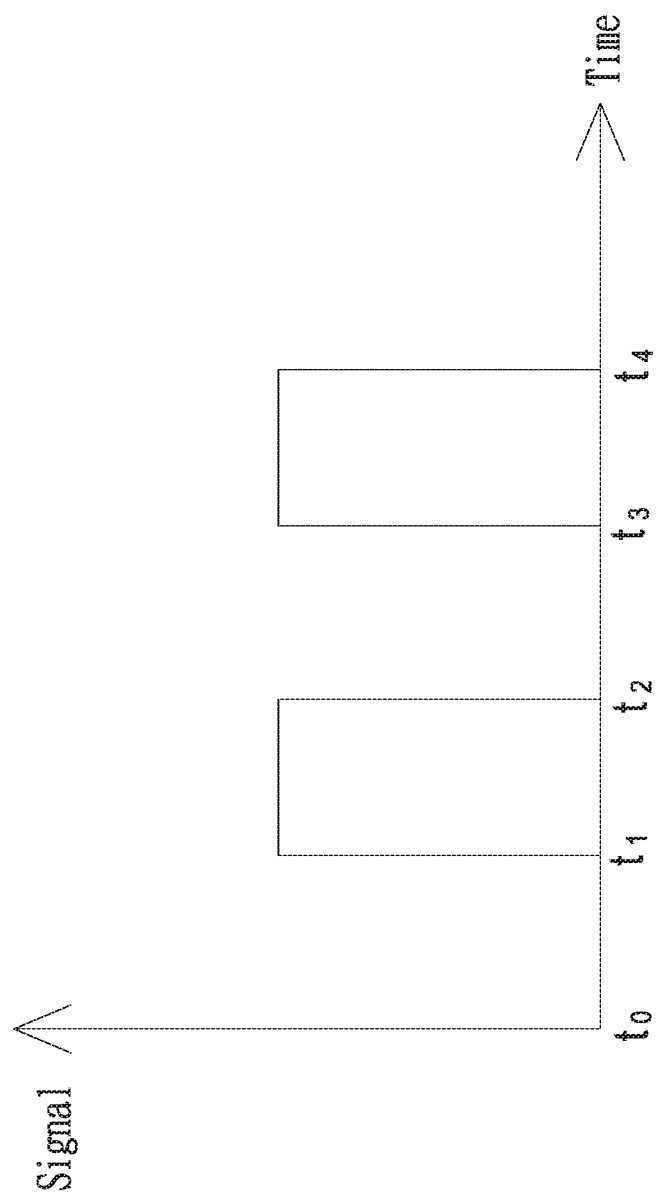
FIG. 7 is an exemplary timing diagram showing the detecting signal according to the operations between the color wheel and the receiver of the rotation speed detector according of FIG. 6.

Please refer to FIGS. 1, 2, 6 and 7, wherein FIG. 7 is an exemplary timing diagram showing the detecting signal according to the operations between the color wheel and the receiver of the rotation speed detector of FIG. 6. when the color wheel rotation speed detecting module 1 is enabled, the motor 4 drives the color wheel 2 to rotate, and the emitter 34 of the rotation speed detector 3 emits the light signal to the first surface 25 of the color wheel 2 for scanning the first segment 23 and second segment 24 at different time. First, at a time period from an initial time point (t0) to a first time point (t1), the motor 4 is enabled for driving the color wheel 2 to rotate at a constant speed, and the emitter 34 of the rotation speed detector 3 emits the light signal to the first surface 25 and further emits to the second segment 24. At this time period, the light signal is reflected by the second segment 24. Consequently, the receiver 35 fails to receive the light signal and fails to produce and output the detecting signal correspondingly. At a time period from the first time point (t1) to a second time point (t2), the motor 4 drives the color wheel 2 to rotate at constant speed continuously, and the emitter 34 of the rotation speed detector 3 emits the light signal to the first segment 23 of the color wheel 2. At this time period, the light signal emitted from the emitter 34 of the rotation speed detector 3 passes through the first segment 23 of the color wheel 2. Consequently, the receiver 35 receives the light signal and produces and outputs the detecting signal correspondingly. At a time period from the second time point (t2) to a third time point (t3), the motor 4 drives the color wheel 2 to rotate at constant speed continuously, and the emitter 34 emits the light signal to the second segment 24 of the color wheel 2 again. At this time period, the light signal is reflected by the second segment 24. Consequently, the receiver 35 fails to receive the light signal and fails to produce and output the detecting signal correspondingly. At a time period from the third time point (t3) to a fourth time point (t4), the motor 4 drives the color wheel 2 to rotate at constant speed continuously, and the emitter 34 emits the light signal to the first segment 23 of the color wheel 2 again. At this time period, the light signal passes through the first segment 23 again. Consequently, the receiver 35 receives the light signal and produces and outputs the detecting signal correspondingly. As a result, the receiver 35 of the rotation speed detector 3 produces and outputs the detecting signal periodically and alternately. Thus, the processor 6 obtains the rotating speed of the color wheel 2 according to the detecting signal varied with time.

From the above descriptions, the present invention provides a color wheel rotation speed detecting module. The color wheel rotation speed detecting module directly uses the structure of the color wheel as an assistance in detecting the rotating speed of the color wheel by a light signal thereof. Under this circumstance, the mark can be omitted, and the issue of failing to detect the rotating speed of the color wheel due to the mark dropping or shifting can be prevented. Consequently, the color wheel rotation speed detecting module can be simplified in structure, and the issue of burning the rotation speed detector due to the high temperature can be prevented.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A color wheel rotation speed detecting module, comprising:
a color wheel comprising a first segment, at least one second segment, a first surface and a second surface, wherein the first segment is adjacent the at least one second segment, a first side of the first segment and a first side of the at least one second segment form the first surface, and a second side of the first segment and a second side of the at least one second segment form the second surface, wherein the first segment is a transparent segment or a hollow segment, and the at least one second segment comprises a phosphor powder wavelength conversion material;
a motor connected with the color wheel for driving the color wheel to rotate;
a rotation speed detector located beside the color wheel for detecting a rotating speed of the color wheel, wherein the rotation speed detector comprises:
an emitter adjacent to the first surface, and is configured to output a light signal to the first segment or the at least one second segment of the color wheel when the color wheel is rotated; and
a receiver adjacent to the first surface, and is configured to output a detecting signal according to whether the receiver is configured to receive the light signal, wherein when the receiver is configured to receive the light signal reflected from the at least one second segment, the receiver is configured to output a detecting signal correspondingly, and when the light signal is configured to pass-through the first segment and the receiver is configured to fail to receive the light signal, the receiver is configured to interrupt the output of the detecting signal correspondingly; and
a processor is configured to receive the detecting signal from the receiver, and obtain the rotating speed of the color wheel according to the detecting signal varied with time.

2. The color wheel rotation speed detecting module according to claim 1, wherein the processor obtains the rotating speed of the color wheel according to two start time points of two adjacent detecting signals.

3. The color wheel rotation speed detecting module according to claim 1, wherein the processor obtains the rotating speed of the color wheel according to two end time points of two adjacent detecting signals.

4. The color wheel rotation speed detecting module according to claim 1, wherein the emitter is an infrared emitter, and the receiver is an infrared receiver.

5. The color wheel rotation speed detecting module according to claim 1, further comprising a casing, wherein the casing has a wall, the wall has a transparent layer, and the rotation speed detector is corresponding to the color wheel through the transparent layer.

6. The color wheel rotation speed detecting module according to claim 5, wherein the rotation speed detector is disposed at one side of the wall, and the rotation speed detector and the color wheel are disposed at two opposite sides of the wall.

7. The color wheel rotation speed detecting module according to claim 5, wherein the transparent layer is a heat insulation transparent layer.

8. A color wheel rotation speed detecting module, comprising:
- a color wheel comprising a first segment, at least one second segment, a first surface, and a second surface, wherein the first surface is opposite to the second surface, the first segment is adjacent the at least one second segment, a first side of the first segment and a first side of the at least one second segment form the first surface, and a second side of the first segment and a second side of the at least one second segment form the second surface, wherein the first segment is a transparent segment or a hollow segment, and the at least one second segment comprises a phosphor powder wavelength conversion material;
- a motor connected with the color wheel for driving the color wheel to rotate;
- a rotation speed detector located beside the color wheel for detecting a rotating speed of the color wheel, wherein the rotation speed detector comprises:
  - an emitter adjacent to the first surface, and is configured to output a light signal to the first segment or the at least one second segment of the color wheel when the color wheel is rotated; and
  - a receiver adjacent to the second surface, and is configured to output a detecting signal according to whether the receiver is configured to receive the light signal, wherein when the receiver is configured to receive the light signal passing through the first segment, the receiver is configured to output a detecting signal correspondingly, and when the light signal is reflected from the at least one second segment and the receiver is configured to fail to receive the light signal, the receiver is configured to interrupt the output of the detecting signal correspondingly; and
- a processor is configured to receive the detecting signal from the receiver, and obtain the rotating speed of the color wheel according to the detecting signal varied with time.

9. The color wheel rotation speed detecting module according to claim 8, wherein the processor obtains the rotating speed of the color wheel according to two start time points of two adjacent detecting signals.

10. The color wheel rotation speed detecting module according to claim 8, wherein the processor obtains the rotating speed of the color wheel according to two end time points of two adjacent detecting signals.

11. The color wheel rotation speed detecting module according to claim 8, wherein the emitter is an infrared emitter, and the receiver is an infrared receiver.

12. The color wheel rotation speed detecting module according to claim 8, further comprising a casing, wherein the casing has a wall, the wall has at least one transparent layer, and the rotation speed detector is corresponding to the color wheel through the at least one transparent layer.

13. The color wheel rotation speed detecting module according to claim 12, wherein the transparent layer is a heat insulation transparent layer.

* * * * *